July 9, 1929.  W. C. BROEKHUYSEN  1,720,519
STORAGE BATTERY CHARGING SYSTEM
Filed Jan. 17, 1925
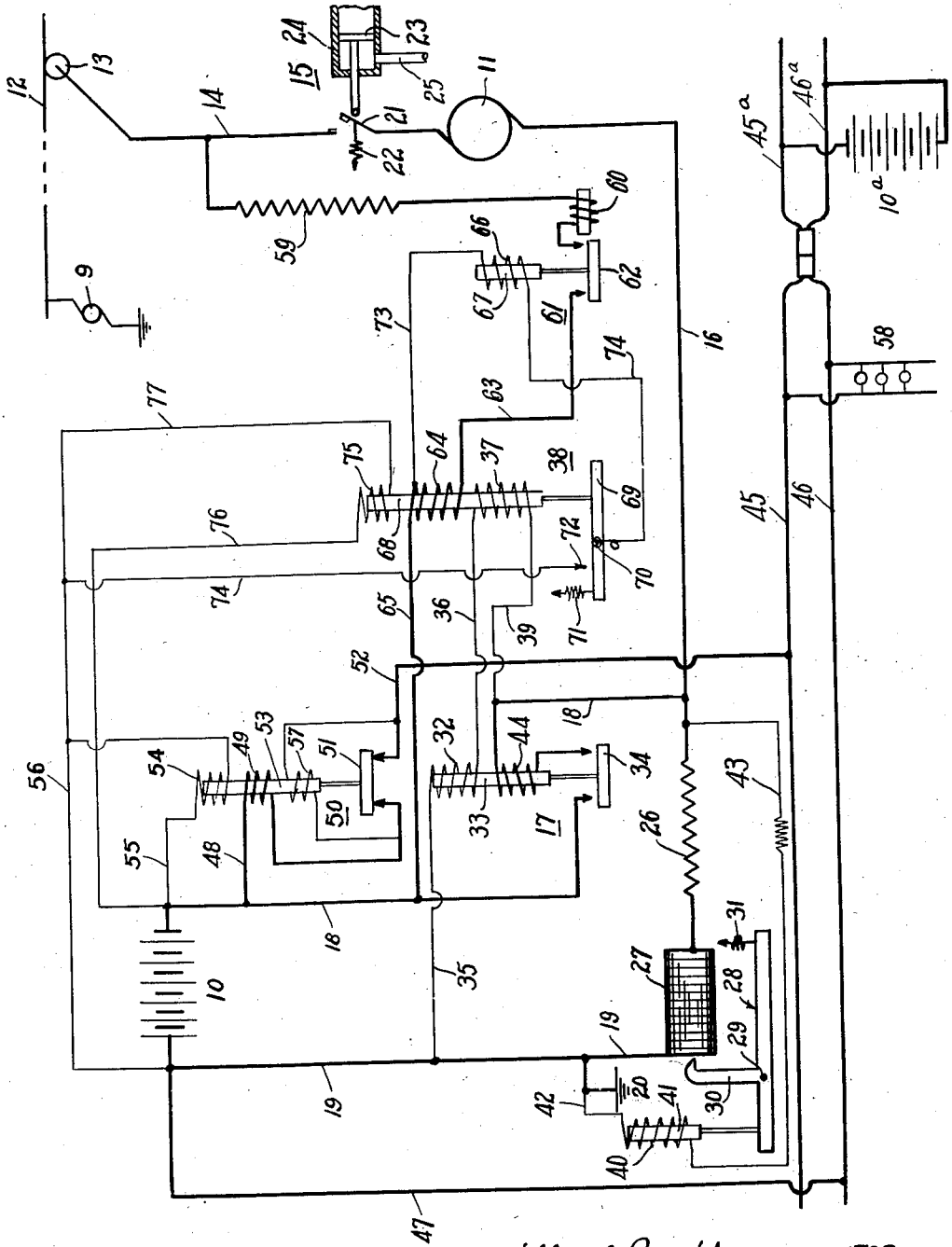
Willem C. Broekhuysen INVENTOR.
By Robert S. Blair
ATTORNEY.

Patented July 9, 1929.

1,720,519

UNITED STATES PATENT OFFICE.

WILLEM C. BROEKHUYSEN, OF NEW HAVEN, CONNECTICUT, ASSIGNOR TO THE SAFETY CAR HEATING & LIGHTING COMPANY, A CORPORATION OF NEW JERSEY.

STORAGE-BATTERY-CHARGING SYSTEM.

Application filed January 17, 1925. Serial No. 2,996.

This invention relates to the charging of storage batteries, more particularly to the charging of storage batteries such as are used for auxiliary purposes, for example, as in the case of electrically propelled vehicles for supplying energy to emergency lights, signal lights, or to the remote or multiple unit system of control of such vehicles.

One of the objects of this invention is to provide a thoroughly practical and reliable arrangement for maintaining the storage battery at the desired state of charge, and for supplying the battery with charging current from the relatively high voltage power or transmission line in a manner at once efficient and economical in operation, and thoroughly dependable in action. Another object of this invention is to provide a system in which the storage battery may be maintained in a proper state of charge throughout the various conditions of activity or inactivity of the vehicle or vehicles, and to which the latter are in practice subjected. Another object of this invention is to provide a system of the above nature in which the battery may not only be maintained in the desired state of charge, but also dependably safeguarded against either overcharge or detrimental over-discharge, as well as safeguarded against receiving a charging current from undesired or unintended sources of current. Another object is to provide a system of the above character of automatic action throughout and well adapted to meet the varied conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing, there is diagrammatically shown a system illustrative of one of various possible embodiments of this invention.

As conductive to a clearer understanding of this invention it might at this point be noted that electrically propelled vehicles, deriving their motive power from a suitable transmission line, such as an overhead trolley or a third rail, for example, are provided with a storage battery, generally of materially less voltage than that of the power line for supplying energy for various auxiliary purposes. This storage battery might, for example, supply energy to an emergency lamp circuit, to the circuits associated with the remote or multiple unit system of control of these vehicles either individually or in trains, and very desirable is it the case that this battery supplies the energy for the train signal lights. Such latter devices are thus made independent of a possible failure of the power line, but in being made dependent upon this storage battery, it is of great practical importance to insure not only the proper charging of the battery, but also its maintenance in desired condition for dependable operation. One of the dominant aims of this invention is to provide a system whereby the storage battery may be well protected against overcharge, or over-discharge, for example, and may be in a thoroughly practical manner maintained in an efficient state of operation.

The storage battery embodied in a vehicle or in the cars of a train for purposes such as stated above, for example, may and preferably does take the form of a battery of relatively low voltage; it may, for example, be a 16-cell battery in which case the average charging voltage may be considered to be in the neighborhood of 40 volts. The power or transmission line voltage may, on the other hand, be relatively high, for example, 600 volts. A further aim of this invention is to provide a system in which the objects noted above may be achieved without sacrifice of economy and efficiency of operation, and hence without entailing high power losses in utilizing a high voltage source for charging a relatively lower voltage battery.

With this preliminary understanding and turning now to the drawing, the battery 10 is seen to be connected into the power or transmission line circuit through a translating device, preferably taking the form of the motor 11, usually associated with each vehicle for driving the compressor, thus to supply a source of air under pressure for operating, for example, the brakes. The circuit of the battery 10 and motor 11 may include the transmission line 12, to which one side of the source of current is connected, a suitable current collecting device shown at 13 in the form of a trolley, conductor 14, a pressure controlled switch generally indicated at 15, a conductor 16, an automatic switch generally indicated at 17, conductor 18, the battery 10, conductor 19 and thence to ground at 20, the other side of the source of current being, as is usually the case, grounded.

The pressure controlled switch 15 is diagrammatically shown as including a contact making member 21 to which is connected a spring 22 tending to maintain the member 21 in circuit closing position; a piston 23 operating in a cylinder 24, the latter supplied with air by way of the pipe 25 leading to the usual storage vessel into which the motor-compressor pumps the air. The switch member 21 will thus be closed as soon as the air pressure has dropped to a predetermined extent, thus to initiate the operation of the compressor motor 11 to replenish the supply of air and bring the latter to its normal or desired pressure. The switch 15 will thus be intermittently actuated, and the circuit of the motor 11 which includes the storage battery 10 will be likewise intermittently closed, thus to permit the battery 10 to receive a charging current during the periods of operation of the motor 11. The necessary reduction in the relatively high voltage of the transmission line to a voltage adequate for charging a battery 10 is thus brought about by the drop in voltage caused by the operation of the motor 11, and the latter, which may be of any suitable type, and which has connected to it a substantially constant load will draw from the source of current a substantially constant current. This substantially constant current may be of a value commensurate with a permissible charging rate to the battery and the latter will thus be dependably safeguarded against high rates of charging.

In order to protect the battery 10 against overcharge, there is shunted about the battery 10 a suitable resistance unit, preferably taking the form of a relatively fixed resistance 26, and a carbon pile 27, the resistance unit 26—27 being connected to the battery 10 with the automatic switch 17 interposed therein. The carbon pile 27 is adapted to be acted upon at its unanchored (left-hand) end, as by means of a lever 28 pivoted at 29 and provided with an arm 30 for acting upon the free end of the carbon pile 27. A spring 31 acts upon the lever 28 and in such a direction that any tendency of the arm 30 to compress the pile 27 is opposed thereby. Normally, therefore, the resistance of the pile 27 is a maximum, and the automatic switch 17, being normally open to circuit of the motor 11, upon the automatic switch 15 being closed, will be completed from the conductor 16 through the resistance unit 26—27 to ground at 20 by way of the conductor 19. The initial flow of current to the motor, being relatively high, will be effective to produce across the resistant unit 26—27 a voltage of substantial value. This voltage will be at once effective to energize the lifting coil 32 of the automatic switch 17, and thus close the switch 17 by lifting its core 33 and hence the bridging member 34 into circuit closing position. The current flowing in the main or motor circuit may thus be divided between the resistance unit 26—27 and the battery 10, and the flow of current to the battery 10 through the coil 44 of the switch 17 is at once effective to assist the coil 32 in holding the switch in closed position. The coil 32 will be seen to be shunted around the resistance unit 26—27, and this shunt circuit will be seen to include conductor 35 (connected to the conductor 19), the coil 32, conductor 36, coil 37 of a relay generally indicated at 38 and to be described in detail hereinafter, conductor 39 and by way of conductor 18 to the other side of the resistance unit 26—27.

The closing of the switch 17 as hereinabove described, however, has been effective to close an energizing circuit for the coil 40 operating by way of core 41 upon one end of the lever 28 and in opposition to the action of the spring 31. More particularly, the coil 40 will be seen to have been connected across the battery 10 (thus to be responsive to battery voltage), one terminal of the coil 40 being connected to the conductor 19 by way of the conductor 42 and the other terminal of the coil 40 being connected by conductor 43 to the conductor 16, through the automatic switch 17, and hence to the other side or pole of the battery 10. The voltage coil 40, upon being energized, is at once made effective to control the value of the ohmic resistance of the resistance unit 26—27 by controlling the pressure exerted upon the carbon pile 27, and, by appropriate adjustment of the tension of the spring 31, the action of the coil 40 is preferably so predetermined that, during the normal period of charge of the battery, the division of current flowing in the motor circuit and between the battery and the resistance unit 26—27 will be such that the battery 10 receives a charging current of a magnitude appropriate to its characteristics. This charging current may be equal to or less than the full current flowing in the motor circuit.

As the battery approaches substantially full charge, the voltage necessary to maintain the flow of charging current thereto is characterized by an appreciable rise; this rise in voltage is at once made effective by way of the coil 40 to increase the pressure on the carbon pile 27 and thus to decrease the value of the resistance shunted around the battery 10. This action is at once followed by a substantial decrease in the flow of current through the battery 10 itself, and if desired, the parts operative upon the carbon pile 10 may be so adjusted or proportioned that substantially no current will flow to the battery 10.

Should the motor 11 be stopped at any time either during the charging of the battery 10 or after the charge thereto has been completed, the battery 10 will momentarily discharge through the switch 17 and into the resistance unit 26—27 connected thereby across the battery; such action reverses the current flow through the coil 44 of the switch 17 and the coil 44 at once opposes the action of the coil 32 and permits the switch 17 to open. The circuit of the coil 40 is likewise opened, thus permitting the carbon pile 27 to assume its maximum resistance, and thus the apparatus is placed in condition for a repetition of the cycle hereinabove described upon the motor 11 being again started.

The vehicle upon which the apparatus is mounted is provided with a pair of conductors 45—46 adapted to form the "train line" and adapted in any suitable way to be connected to the train line conductors of an adjacent car. Thus at 45$^a$ and 46$^a$ are indicated diagrammatically the train line conductors of an adjacent car or vehicle and to which is connected a battery 10$^a$ individual to the adjacent car. The battery 10 is connected across the train line conductors 45—46 so that the various devices connected thereto may be supplied with energy; thus, one pole of the battery 10 is connected to the train line conductor 46 by way of the conductor 47; the other pole of the battery 10 is connected to the other train line conductor 45 by the conductor 48, the coil 49 of a switch generally indicated at 50, the bridging member 51 of the switch 50, and conductor 52. The switch 50 is normally closed and effective upon the core 53 of the switch 50, in addition to the coil 49, is a coil 54 connected across the poles of the battery 10 as by the conductors 55 and 56. The coil 54 is of such a strength, when energized by the battery 10, that it is ineffective of itself to lift the core 53 and hence the bridging member 51 of the switch 50. The current flowing from the battery 10 to the train line 45—46 passes through the coil 49 of the switch 50, this coil being so wound with respect to the coil 54 that current discharging from the battery 10 will oppose the action of the coil 54 and thus maintain it in a weakened state. As soon, however, as the battery 10 receives current from the train line 45—46, the current in the coil 49 is reversed, the coil 49 assists the coil 54, and the two coils are at once effective to lift the core 53 and hence open the switch 50. A coil 57 is connected across the contacts of the switch 50 and becomes energized as soon as the bridging member 51 is moved to open the switch; this coil 57 is wound in a direction with respect to the coil 54 so that the former aids the latter in holding the switch open, and the switch will be held open as long as the voltage across the train line conductors 45—46 is above the voltage of the battery 10.

In this manner the battery 10 is protected against receiving a charging current from either the battery of an adjacent car connected to the train line or from the charging circuit of such a battery; thus uncontrolled charging of the battery 10 is effectively prevented as well as also undesired inter-action between batteries of various cars connected to the same train line. Such inter-action is particularly liable to occur where the battery of one car, such as the battery 10, is of the lead type and the battery of another car is of the Edison type, the latter having a materially higher charging voltage characteristic than the former type.

Among the devices supplied with energy from the train line 45—46 are the signal lights diagrammatically indicated at 58. As long as the car or train is maintained in operation or in such a character of traffic as necessitates a frequent enough operation of the compressor motor 10 to ensure the supply of charging current to the battery 10, the latter will be maintained in a desired state of charge, as hereinbefore described. In order, however, to insure the maintenance of the battery 10 in an efficient operative condition and to insure the supply by it of energy, particularly to the train signal lights where the character of traffic is changed, so that the motor 11 is operated too infrequently or where the car or train is made to remain at rest for relatively long periods of time, in which case the motor 11 is not operated, provision is made for supplying the battery 10 with charging current. With the motor 11 at rest and hence with the switching member 21 open, the switch 17, as hereinbefore noted, will also be open. There is, however, provided another circuit for charging the battery 10 from the transmission or power line. This circuit includes a resistance 59, one terminal of which is connected to the conductor 14 leading from the current collecting device 13, the coil 60 of an automatic switch generally indicated at 61, the bridging member 62 of the switch 61, conductor 63, the coil 64 of the switch 38, the conductor 65, conductor 18, to one pole of the battery 10, through the battery 10 and by way of conductor 19 to ground at 20. The resistance 59 may be given such a value that the current in this charging circuit may be maintained at a value commensurate with the desired charging rate of the battery 10; preferably however, the resistance 59 is of such a value that there is permitted to flow in this charging circuit a value of current ample to supply a small charging current to the battery and enough current to supply the devices connected to the train line conductors 45—46, such as the signal lamps 58.

This charging circuit may be closed by way of the bridging member 62 of the switch 61.

The circuit closing movement of the bridging member 62 is effected by a coil 66 surrounding the core 67 to which the bridging member 62 is mechanically connected. The circuit of the coil 66 is controlled by the switch or relay 38; the latter includes the core 68 mechanically connected to the circuit closing member 69 pivoted as at 70, a spring 71 acting upon the member 69 in such a direction as to tend to swing the member 69 into electrical connection with the fixed contact 72. The circuit of the coil 66 of the switch 61 includes the contact 72 and the contact member 69, and upon closure of the switch 38, the coil 66 will be connected across the battery 10 and hence energized. More particularly, the circuit of coil 66 will be seen to include the conductor 18 leading from one pole of the battery 10, the conductor 65, conductor 73, coil 66, conductor 74, switch member 69, contact 72, conductor 74, conductor 56 and thence to the other pole of the battery 10.

Acting on the core 66 of the switch 38 is a coil 75 connected directly, as by the conductors 76 and 77—56, across the battery 10. This coil is thus responsive to battery voltage and is so proportioned with respect to the tension of the spring 71 that, during periods of substantial charge in the battery 10, the coil 75 will hold the switch 38 open at the contact member 61—72; as the battery 10 continues to discharge, as by way of supplying energy to the signal lamps 58, for example, and in the absence of the closure of the first-mentioned charging circuit through the switch 15, the battery voltage continues to drop, and as soon as it has fallen to a value corresponding to a state of substantial discharge (and beyond which it would be harmful to discharge the battery 10), the tension of the spring 71 overcomes the opposing action of the coil 75 and the circuit of coil 66 of switch 61 is closed at the contact member 69—72. The switch 61 is at once closed and the supply of current to the battery 10, as well as to the train line, proceeds. The resultant flow of current in this charging circuit and through the coil 64 of the switch 38 is made effective through the coil 64 to oppose the action of the coil 75, thus in effect decreasing any opposition to the action of the spring 71 in holding the circuit of coil 66 dependably closed. Should the resultant charging of the battery 10 continue for a sufficiently long period of time to substantially fully charge the battery, the accompanying rise in voltage of the battery 10, particulary at the completion of the charge, increases, the strength of the coil 75 sufficiently to overcome the opposing action of coil 64 and of the spring 71, thus opening the circuit of coil 66 at the contact member 69—72. The coil 66 being thus open-circuited, the charging circuit is opened at the switch 61. Thus, the battery is effectively safeguarded against overcharge. A coil 60, in the charging circuit preferably, provides a magnetic flux or field across the contacts of switch 61 to prevent serious arcing when the contacts are opened.

If during the effectiveness of the above-mentioned charging circuit, the compressor motor 11 should be placed in operation, as by the automatic switch 15, thus making the initial charging circuit effective, the voltage produced by the current flow through the resistance unit 26—27 will, as hereinbefore noted, energize the lifting coil 32 of switch 17, but will also energize coil 37 of switch 38, these two coils being preferably serially connected in a shunt relation to the resistance unit 26—27. The resultant current flow through the coil 37 of switch 38 (should the switch 38 be closed) is made, by appropriately relating the coils about the core 68, to aid the coil 75 and to effect an opening of the switch 38, thus opening the circuit of the coil 66 of switch 61, which in turn opens the charging circuit then effective at the switch 61. The energization of the coil 32 of switch 17 connects the battery 10 in circuit with the motor 11 and also prepares the coil 40 operating upon the resistance pile 27 for controlling the current flow to the battery.

It will thus be seen that there has been provided in this invention a system for maintaining the storage battery in charged condition, for reliably and dependably insuring an effective operative condition of the battery under the varied conditions of practical operation to which the vehicle, car or train may be subjected, and for dependably protecting the battery against charge from undesired or uncontrolled sources, as well as against overcharge when supplied with current from the desired source or sources. Moreover, it will be seen that the apparatus and system provided in this invention is automatic throughout, of efficient operation, and well adapted to meet the varied conditions of practical use.

As many possible embodiments may be made of the above invention, and as many changes might be made in the embodiment above set forth, it is to be understood that all matter hereinbefore set forth is to be interpreted as illustrative and not in a limiting sense.

I claim as my invention:

1. In an apparatus of the character described, in combination, a source of current, a circuit including a translating device and a storage battery connected to said source so that when one receives current from said source the other will also, means for cutting down the flow of current to said battery as the latter approaches substantially full charge while permitting operation of said translating device, means for connecting said battery to said source to receive a charging current therefrom independently of said translating device, and means dependent upon the electrical condition of said circuit for controlling the operation of said last-mentioned means.

2. In an apparatus of the character described, in combination, a source of current, a circuit including a translating device and a storage battery connected to said source so that when one receives current from said source the other will also, means for cutting down the flow of current to said battery as the latter approaches substantially full charge while permitting operation of said translating device, means for connecting said battery to said source to receive a charging current therefrom independently of said translating device, and means responsive to the state of charge of said battery for controlling the operation of said last-mentioned means.

3. In an apparatus of the character described, in combination, a source of current, a circuit including a translating device and a storage battery connected to said source so that when one receives current from said source the other will also, means for cutting down the flow of current to said battery as the latter approaches substantially full charge while permitting operation of said translating device, means adapted when said battery reaches a predetermined state of discharge to connect said battery to said source to receive charging current therefrom independently of said translating device and to disconnect said battery from said source when the battery is substantially fully charged, and means dependent upon the electrical condition of said circuit for controlling the connecting operation of said last-mentioned means.

4. In an apparatus of the character described, in combination, a source of current, a circuit including a translating device and a storage battery connected to said source so that current passing from said source through said translating device serves to charge said battery, means for cutting down the flow of current to said battery as the latter approaches substantially full charge while permitting operation of said translating device, and means adapted to connect said battery to said source to receive charging current therefrom independently of said translating device.

5. In an apparatus of the character described, in combination, a source of current, a circuit including a translating device and a storage battery connected to said source so that when one receives current from said source the other will also, a work circuit adapted to be supplied by said battery, and means operative when said battery is substantially discharged and when said first-mentioned circuit is ineffective, for permitting said work circuit to draw current from said source of current.

6. In an apparatus of the character described, in combination, a source of current, a circuit including a translating device and a storage battery connected to said source so that when one receives current from said source the other will also, a work circuit adapted to be supplied by said battery, means actuated upon said battery becoming discharged to a predetermined state for connecting said battery and work circuit to said source of current, and means preventing the operation of said last-mentioned means while said first-mentioned circuit is effective to supply charging current to said battery.

7. In apparatus of the character described, in combination, a source of current; a translating device in circuit with, and adapted to receive current from, said source; means for controlling the supply of current from said source to said translating device; a storage battery; means connecting said translating device and said storage battery in circuit with each other so that said battery can receive charging current from said source only when said translating device is connected, by said controlling means, to receive current from said source; and means acting in response to said battery achieving a predetermined state of discharge for connecting said battery alone to said source to be charged therefrom.

8. In an apparatus of the character described, in combination, a source of current, a translating device and a storage battery connected so that when one receives current from said source the other will also, means for connecting said device and said storage battery to said source, means adapted, when said battery is discharged to a predetermined state, to connect said battery alone to said source, and means effective to cut down the current to said battery as the latter becomes substantially fully charged.

9. In an apparatus of the character described, in combination, a source of current, a translating device and a storage battery connected so that when one receives current from said source the other will also, means for connecting said device and said storage battery to said source, means responsive to the state of charge of said battery for controlling the flow of current thereto while permitting operation of said device, means adapted when said battery approaches a predetermined state of discharge to connect said battery alone to said source, means effective when said battery is substantially fully charged to cut down the current flowing thereto, and means adapted to prevent simultaneous operation of both of said connecting means.

10. In an apparatus of the character described, in combination, a source of current, a translating device and a storage battery connected so that when one receives current from said source the other will also, means for connecting said device and said storage battery to said source, means for connecting said battery alone to said source, and means effective upon the connecting operation of one of said connecting means to open the other connecting means.

11. In an apparatus of the character described, in combination, a source of current, a translating device and a storage battery connected so that when one receives current from said source the other will also, means for connecting said device and said storage battery to said source, means for connecting said battery alone to said source, means controlled by the state of charge of said battery for closing one of said connecting means, and means effective upon the closure of the other of said connecting means to open said last-mentioned connecting means.

12. In an apparatus of the character described, in combination, a source of current, a translating device and a storage battery connected so that when one receives current the other will also receive current from said source, means responsive to the state of charge of said battery for connecting said battery alone to said source of current, means acting independently of the state of charge of said battery for connecting said device and said battery to said source of current, and means for cutting down the current flow to said battery upon the latter being substantially fully charged.

13. In an apparatus of the character described, in combination, a circuit having included therein a source of current, a translating device and a storage battery connected so that when one receives current from said source the other will also; a second circuit having included therein said source of current and said battery; a work circuit having included therein said storage battery and another source of current; means adapted alternatively to close either said first-mentioned circuit or said second-mentioned circuit, thereby to permit said battery to receive charging current; and means for preventing said battery from receiving charging current from said second-mentioned source included in the work circuit.

14. In an apparatus of the character described, in combination, a circuit having included therein a source of current, a translating device and a storage battery connected so that when one receives current from said source the other will also; a second circuit having included therein said source of current and said battery; a work circuit having included therein said storage battery and another source of current; means adapted alternatively to close either said first-mentioned circuit or said second-mentioned circuit, thereby to permit said battery to receive charging current; and means for closing said work circuit only when the voltage of the latter due to said second-mentioned source is equal to or less than the voltage of said battery.

15. In an apparatus of the character described, in combination, a circuit having included therein a source of current, a translating device and a storage battery connected so that when one receives current from said source the other will also; a second circuit having included therein said source of current and said battery; means adapted alternatively to close either said first-mentioned circuit or said second-mentioned circuit, thereby to permit said battery to receive charging current from said source; and means for cutting down the flow of current to said battery as the latter is substantially fully charged.

16. In an apparatus of the character described, in combination, a translating circuit having therein a source of current, an intermittently operative translating device, a resistance in series with said device and a storage battery shunted across said resistance, whereby said battery may receive charging current from said circuit during periods of operation of said device; and means effective only when said device is not operative and responsive to a predetermined state of discharge of said battery for connecting said battery directly to said source.

17. In an apparauts of the character described, in combination, a source of current, an intermittently operative translating device adapted to be operated from said source of current and a storage battery connected in series with said device to receive a charging current during periods of operation of said device, a current limiting device, and means responsive to a predetermined state of discharge of said battery for connecting said battery and said current limiting device to said source of current.

18. In an apparatus of the character described, in combination, a source of current, an intermittently operative translating device adapted to be operated from said source of current and a storage battery connected in series with said device to receive a charging current during periods of operation of said device, a resistance, and means adapted to operate when said device is not in operation for connecting the battery and said resistance in series to said source of current.

19. In an apparatus of the character described, in combination, a source of energy, a motor, a storage battery in series with said motor adapted thereby to receive charging current when said motor is in operation, automatically operative means for intermittently closing the circuit to said motor and hence to said battery, a current limiting device, means adapted, after circuit-opening operation of said last-mentioned means to permit connection of said battery and said current limiting device to said source of current, and means effective when said motor is placed in operation by said circuit closing means for opening the circuit in which said battery and said current limiting device are included.

20. In an apparatus of the character described, in combination, a source of energy, two circuits connected to said source, one circuit including a translating device and a storage battery and the other circuit including said storage battery and a current limiting device, means for closing one of said circuits, means for closing the other of said circuits, dependent in operation upon the electrical condition of the other circuit, and means for stopping the charge to the battery as the latter approaches substantially full charge.

21. In an apparatus of the character described, in combination, a source of energy, two circuits connected to said source, one circuit including a translating device and a storage battery and the other circuit including said storage battery and a current limiting device, means dependent upon the state of discharge of said battery for closing said second-mentioned circuit, and means dependent upon the electrical condition of said first-mentioned circuit for controlling the operation of said last-mentioned means.

22. In an apparatus of the character described, in combination, a source of energy, two circuits connected to said source, one circuit including a translating device and a storage battery and the other circuit including said storage battery and a current limiting device, means dependent upon the state of discharge of said battery for closing said second-mentioned circuit, and means responsive to current flow in said first-mentioned circuit for opening said second-mentioned circuit.

23. In apparatus of the character described, in combination, a circuit having included therein a storage battery and a source of current from which said battery may receive charging current, a work circuit connected to said battery and having included therein another source of current, means responsive to the state of charge of said battery for opening said first-mentioned circuit when the battery has been substantially fully charged, and automatic means adapted to open said second-mentioned circuit and effective when said second-mentioned source tends to supply charging current to said storage battery.

24. In apparatus of the character described, in combination, a circuit having included therein a storage battery and a source of current from which said battery may receive charging current, a work circuit connected to said battery and having included therein another source of current, a switch for controlling said first-mentioned circuit, a relay responsive to the state of charge of said battery and adapted to control the circuit-closing and circuit-opening operation of said switch substantially in accordance with the state of charge of said battery, and automatic means for controlling said second-mentioned circuit adapted to open said circuit when said second-mentioned source tends to supply charging current to said battery.

In testimony whereof, I have signed my name to this specification this 19th day of December, 1924.

WILLEM C. BROEKHUYSEN.